June 1, 1943.  K. M. HAMMELL  2,320,457
FUEL FEED CONTROL DEVICE
Filed June 5, 1942  3 Sheets-Sheet 1
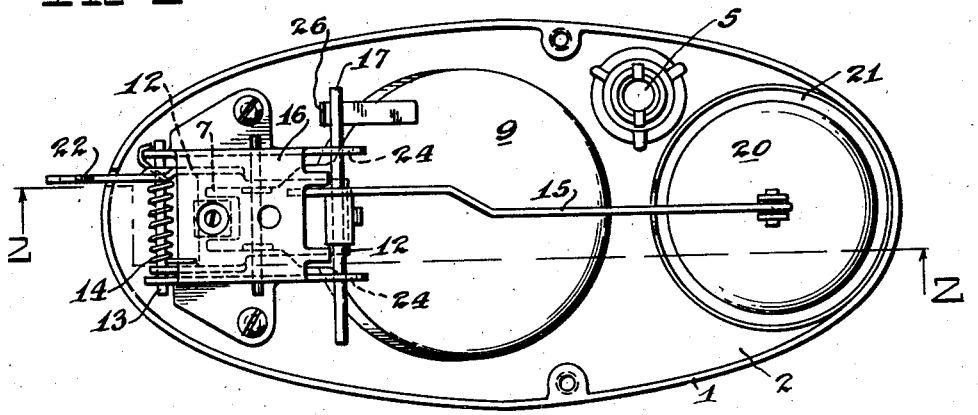
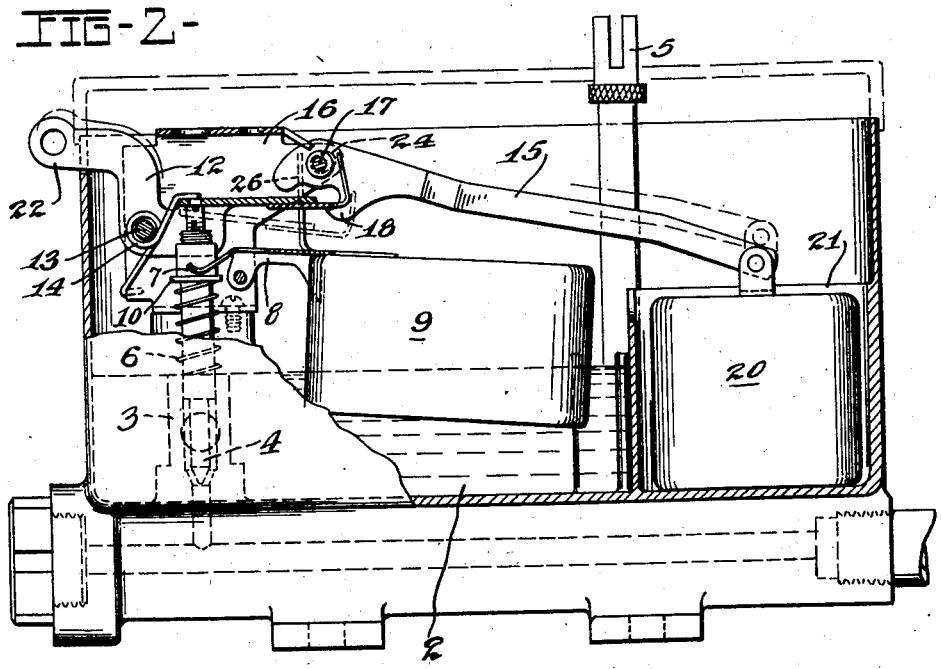
Inventor
KEMPER M. HAMMELL
By Owen & Owen
Attorney

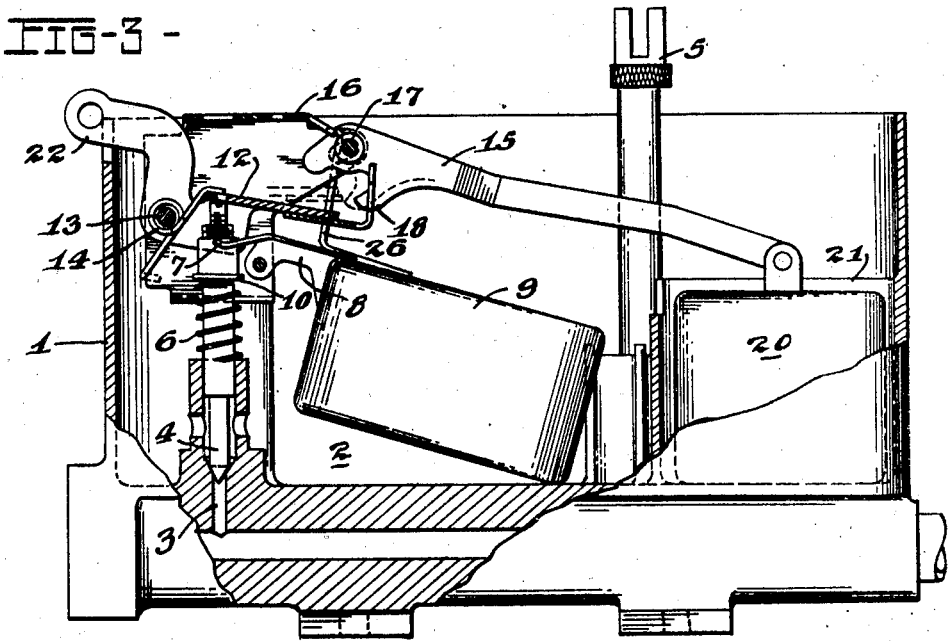
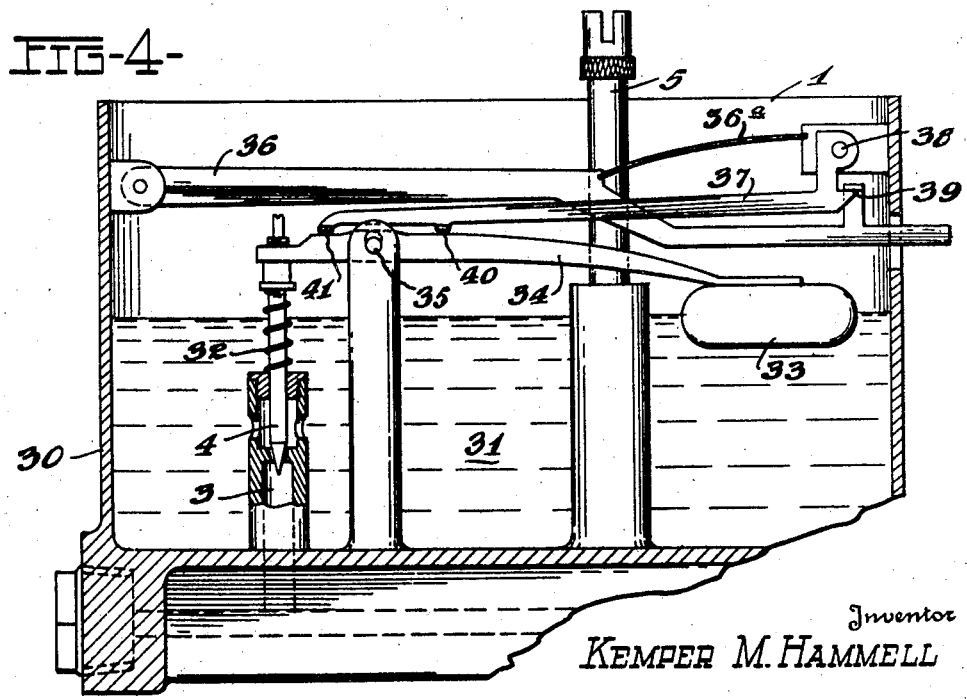

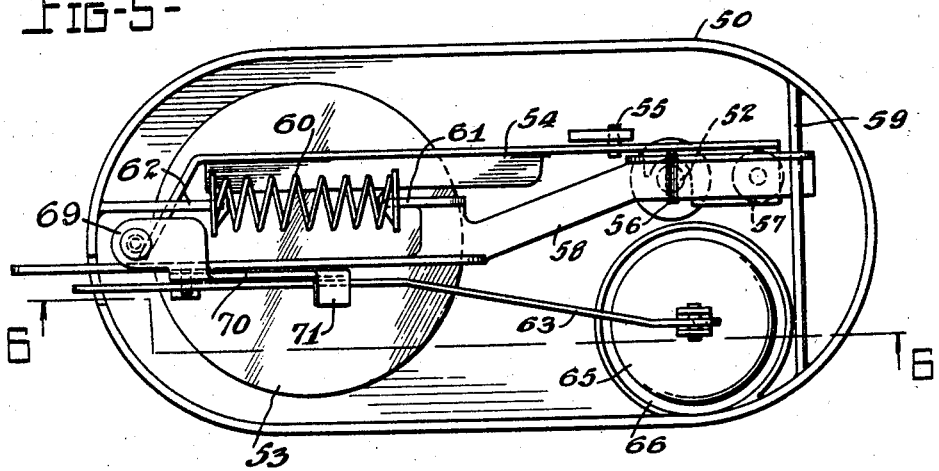
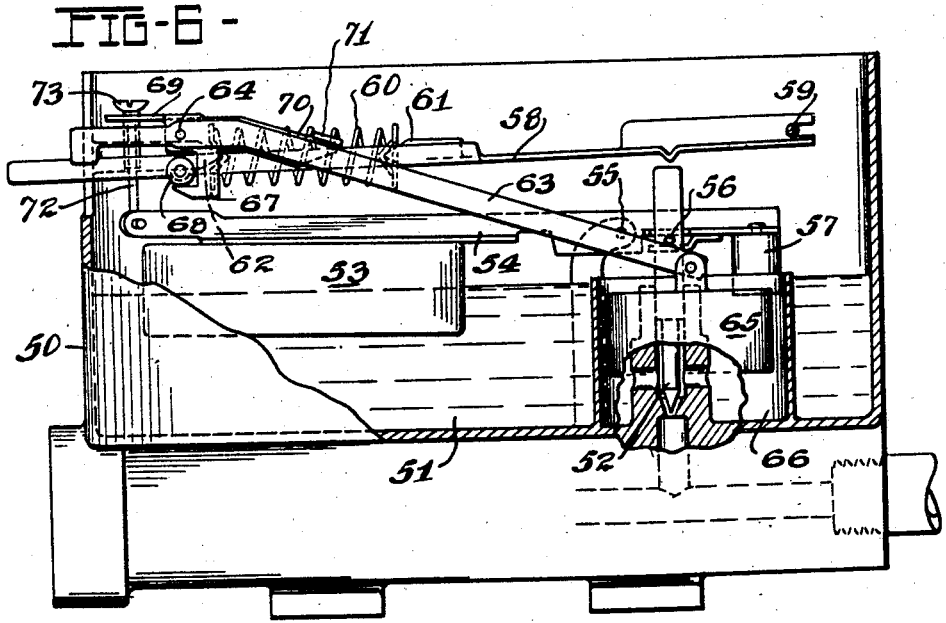

Patented June 1, 1943

2,320,457

UNITED STATES PATENT OFFICE 2,320,457

FUEL FEED CONTROL DEVICE

Kemper M. Hammell, Toledo, Ohio, assignor to The Swartzbaugh Manufacturing Company, Toledo, Ohio, a corporation of Ohio Application June 5, 1942, Serial No. 445,879

7 Claims. (Cl. 137—68)

This invention relates to liquid fuel feed controlling devices for use particularly in connection with oil burners.

In control devices of this character, provision is made for automatically shutting off the fuel supply when, for any cause, the fuel rises above a predetermined level in the device. There is, however, so far as I am aware, no provision in any such device in commercial use for shutting off the fuel when the supply has fallen below that necessary to keep the associated burner or burners properly burning. It is well known that it is dangerous to permit a rapid flow of fuel into a hot burner from which the fuel has been recently burned. Explosions and fires are likely to result from such practice.

The primary object of the present invention is to provide a simple, novel and efficient means in connection with fuel feed controlling devices, which is automatically operable by a predetermined low level of fuel in the device to shut off the supply thereto and to maintain it closed until manually opened.

The invention is fully described in the following specification, and a few embodiments thereof in connection with different forms of existing fuel feed control devices illustrated in the accompanying drawings, in which—

Figure 1 is a top plan view of one form of fuel feeding device embodying the invention, with the cover removed, and with the control parts in normal position for fuel feeding; Fig. 2 is a partially vertical section thereof on the line 2—2 in Fig. 1; Fig. 3 is a section similar to Fig. 2, with the control parts in fuel supply shut-off position due to low level fuel condition therein; Fig. 4 is a vertical sectional view of another form of fuel feed control device embodying the invention, with the control parts in normal fuel feeding position; Fig. 5 is a plan view of another form of fuel feed control device embodying the invention, and Fig. 6 is a vertical section thereof on the line 6—6 in Fig. 5, with parts in full and showing the control parts in normal use position.

Referring particularly to the form of the invention shown in Figs. 1 to 3, 1 designates a casing in which the feed control parts are disposed and which forms a fuel chamber 2 having a fuel admission port 3 in its bottom adapted to be closed by a needle valve 4. The fuel outlet (not shown) from the chamber 2 for supplying the associated burners is disposed in the bottom of the chamber 2 and is controlled by a suitable valve, the top metering control of which is indicated at 5. The valve 4 is normally maintained open by a coiled expansion spring 6 and is closed against the spring 6 by the action thereon of one or more fingers 7 on the pivoted arm 8 of the float 9 when such float has been raised a predetermined extent by liquid in the chamber 2. The fingers 7, in the present instance, straddle the upper end portion of the valve stem and act against a shoulder or flange 10 thereon to effect a closing of the valve when the float is raised.

A rocker member 12 is pivoted for vertical rocking movements within the upper portion of the chamber 2 at 13 and is normally held by a spring 14 in valve closing engagement with the upper end of the valve stem 4, as shown in Fig. 3. During normal fuel feeding operations, the rocker member 12 is releasably retained in raised, open valve position by a trip lever 15, which is pivoted to a stationary frame part 16 of the casing by a cross-pin 17. This trip lever has a trip finger 18 which engages an edge of the trip member 12 and retains it in raised position when the trip lever is in normal lowered position, as shown in Figs. 2 and 3. The long arm of the lever 15 is connected to an auxiliary float 20, which operates in a well 21 in the chamber 2, so that a raising of the float from normal lowered position in the well will effect a tripping of the engagement of the lever with the rocker member 12, thus permitting such member to lower and effect a closing of the inlet valve 4. The well 21 is filled from the chamber 2 when the level of the liquid has raised a predetermined extent above normal in the chamber. It is thus apparent that filling the well from the chamber causes a raising of the float 20 sufficient to effect a tripping of the rocker member 12, so that it may then act to close the inlet valve. The rocker member 12 has a control arm 22 extending without the top portion of the chamber 2 to facilitate manual movement of such member to the position in which the inlet valve is reopened and the trip lever reengaged.

Nothing novel is claimed for the control mechanism above described, as this is a form of safety control device on the market. In this device, however, while double provision is made for closing the supply valve when the liquid reaches a dangerous or abnormal high level in the chamber 2, there is no provision for closing such valve when the supply of liquid in the chamber has, from any cause, become exhausted or has reached an abnormal or dangerously low level.

The purpose of the present invention is to provide fuel feed controls of this character with a safety device which will effect a closing of the valve when the fuel supply in the chamber has reached a predetermined low point and will maintain the valve in its closed position until a manual resetting of the device in valve open position is effected.

To accomplish this closing action of the valve upon a predetermined low level condition of the liquid, the trip lever 15 has its fulcrum pin 17 mounted in inclined slots 24 in the frame part 16, such slots being inclined with their lower ends, in the present instance, directed toward the member 12. It is apparent that the fulcrum pin 17 has a transverse loose or lost motion movement in these slots, and that when it is resting in the lower end portions of the slots, with the float 20 in its normal lowered position, the catch finger 18 of the lever is adapted to have supporting engagement with the rocker member 12, as shown in Fig. 2. Also, that a transverse movement of the pin 24 from such position upwardly in the slots will cause the trip lever to move sufficiently to release its finger 18 from engagement with the member 12, thereby releasing the member 12 to permit it to effect a closing of the valve 4, as shown in Fig. 3. The float 9 has a finger 26 rising therefrom at the side thereof adjacent to the float fulcrum and extending up at the inner side of the fulcrum pin 17. When the fuel in the chamber 2 is in substantially normal level position, the finger 26 is free from engagement with the pin 17, but upon a predetermined lowering of the level of the fuel in the chamber, the float 9 will lower sufficiently to cause the pin 26 to engage and move the fulcrum pin 17 a sufficient distance outward or upward in the slots 24, or at least in one of such slots, to disengage the trip finger 18 from supporting engagement with the rocker member 12, thus releasing such member and permitting it to move under the action of its spring 14 to effect a closing of the valve 4.

In the present instance, the trip lever 15 engages the fulcrum pin 17 nearer to one of the pin bearing parts of the frame 16 than the other, and the finger 26 is positioned adjacent to said near side of the frame, so that a tripping movement of the finger in engagement with the fulcrum pin will cause a sufficient rocking of the adjacent end of the pin 17 to release the trip lever from engagement with the rocker member 12. During such rocking action, the pin 17 has a fulcrum bearing in the bearing slot 24, which is more remote from the finger 26, and for this reason it is not important to have such more remote bearing opening in the form of a slot, so long as it permits a free rocking movement of the pin.

It is thus apparent that with the described form of control device, the rocker member 12 may be released and permitted to operate to effect a closing of the valve 4 either by a releasing movement of the trip lever 15 caused by a raising of the float 20 under a predetermined abnormally high level condition of the liquid in the chamber 2, or by reason of a releasing movement of the trip lever by the engagement of the float finger 26 therewith when the float 9 has lowered a predetermined extent in the chamber due to a low liquid level condition therein.

In the form of control device illustrated in Fig. 4, a single float is employed and the tripping of the rocker member to permit a valve closing movement thereof is effected by such float when moved a predetermined extent both above and below a normal liquid level position. In this form of the device, 30 designates the casing forming the fuel chamber 31; 32 is the valve for closing the inlet to the chamber; 33 is the float, the arm 34 of which is pivoted at 35 and has its free end acting against the valve 32 to close it when the float is raised a predetermined extent by a high liquid level condition. 36 is the rocker member which, when lowered from its suspended catch position, engages the upper end of the valve stem and moves the valve to closed position. In this particular form, the length of the lever and its weight are sufficient to force the valve closed although a spring 36ª is preferably used to supplement this action. The trip lever 37 is fulcrumed at 38 and has a catch finger 39 which is adapted to engage and support the rocker member 36 in the raised position shown. This trip lever has a long arm extending over the float arm 34 lengthwise thereof and provided with lugs 40 and 41 at opposite sides of the float arm pivot and adapted to have loose engagement with the float arm. It is apparent that upon a raising of the float above normal liquid level position, the float arm will exert an upward pressure against the trip lever lug 40 to effect a raising of the lever to release its engagement with the rocker member 36, and also that a lowering of the float a predetermined extent below normal liquid level position will cause the float arm to act on the lug 41 and impart a tripping movement to the trip lever. The only novelty claimed for this form of control is the extension of the trip lever, so as to have engagement with the float arm whereby a lowering of the float will impart a tripping movement to the lever.

In the form of control device shown in Figs. 5 and 6, 50 designates the casing forming the main liquid chamber 51; 52 is the valve which controls the inlet to the chamber; 53 is the main float, the arm 54 of which is pivoted at 55 and has connection with the valve stem at 56 whereby the valve is opened by a raising of the float and closed by a lowering thereof. The float arm 54 at the opposite side of its fulcrum to the float is provided with a counterweight 57. The rocker member 58 is of long arm type, being pivoted within the casing at one end at 59 and extending therefrom over the upper end of the valve stem and without the opposite side of the casing 50 to facilitate manual manipulation. When this rocker member is lowered a predetermined extent, it engages the top of the valve stem and moves the valve to closed position. A coiled expansion spring 60 acts on the rocker member 58 to normally cause it to move downward to valve closing position. This spring has one end bearing against a thrust finger 61 on the rocker member and its other end bearing against a fixed projection 62 on the inner side of the casing 50, with the point of engagement of the latter slightly above a line drawn through the center of the rocker pivot 59 and the thrust point of the finger 61, thus urging a downward movement of the rocker member. The trip lever 63 is fulcrumed to a post or other fixed casing part by a pin 64 and has its long arm connected to an auxliary float 65 operating in a well 66 within the chamber 51 and into which liquid flows from the chamber when it has raised a predetermined extent above normal level position in the chamber. The catch finger 67 on the lever 63 is pivoted to the lever fulcrum 64 for rocking movements relative to the lever and has its lower end provided with a catch portion for releasably engaging under a projection 68 on a side of the rocker member, while its upper end portion is provided, lengthwise of the lever, with oppositely projecting arms 69 and 70. The arm 70 has a finger 71 which engages over the top of the lever arm so that a raising of the lever by the float 65 will effect a rocking of the catch finger 67 in a direction to release its engagement with the rocker member and permit such member to lower under the action of the spring 60 and effect a closing of the valve 52.

A link 72 projects freely down through an opening in the arm 69 of the catch finger and is pivotally connected at its lower end, in the present instance, to an extension on the free end of the float arm 54. This link is provided at its upper end with a head or enlargement 73, which engages the arm 69 when the float 53 has lowered a predetermined extent from normal liquid level position and then, during a continued lowering of the float, actuates the arm 69 and its catch finger 67 to release the latter from engagement with the rocker member 58, thus permitting such member to lower and effect a closing of the valve 52. The novel feature of this form of control device is the provision of the pivoted catch finger 67 on the trip lever 63, the connection of such catch finger with the float 53, whereby a predetermined lowering of the float will impart movement to the catch finger to release its supporting engagement with the rocker member 58, and the provision of the catch finger arm 70 in engagement with the trip lever, whereby a float actuated movement of the lever under high liquid level conditions will move the catch finger to release the rocker member and permit it to effect a closing of the valve.

It is apparent that in each form of control device embodying the invention, there is provided a normally open supply valve, a rocker member adapted to have movement to close the valve, a trip lever having releasable catch engagement with the rocker member to adapt it to hold such member in valve open position, means actuated by a predetermined high liquid level condition to release the catch finger from the rocker member to permit the latter to move to close the valve, together with means having a loose or lost motion connection with an actuated by a predetermined lowering of the float from normal liquid level position to effect a release of the catch finger from engagement with the rocker member to permit movement of the latter to close the valve and to maintain it closed until the trip parts are manually reset.

It will be understood that in each of the control devices, the only novelty claimed is the means provided for effecting a tripping of the catch engagement of the trip lever with the rocker member when the liquid level determining float has lowered a predetermined extent in the chamber due to a dangerous or low level fuel condition therein, thereby effecting a positive closing of the valve by the released action of the rocker member and maintaining such condition until the rocker member has again been moved into catch engagement with the trip lever.

I wish it understood that my invention is not limited to any specific construction, form or arrangement of the parts, as it is capable of numerous modifications and changes without departing from the spirit of the claims.

Having thus described my invention, what I claim as new and desire to secure by United States Letters Patent is:

1. The combination with a liquid feed controlling device wherein a pivoted float operates in a liquid chamber, a normally open valve closes a supply port to the chamber, a rocker member normally acts on the valve to close it, and a trip member is adapted to engage the rocker member and prevent valve closing movements thereof, of means attached to and movable by the float and having lost motion connection with said trip member to impart tripping movements thereto to release the rocker member to permit it to close the valve when a predetermined low liquid level condition is present in the chamber.

2. In a combination as called for in claim 1, wherein said trip member has a transversely movable fulcrum, and said means comprises a finger rigidly projecting from the float and movable by predetermined low liquid level movement of the float to impart transverse movement to the trip member and its fulcrum to release the rocker member.

3. The combination with a liquid feed controlling device wherein a float operates in a liquid chamber, a normally open valve closes a supply port to the chamber, a rocker member normally acts on the valve to close it, and a float actuated trip lever is adapted to engage and hold said rocker member in open valve position and operable when tripped to release said member, said lever having a transversely movable fulcrum, of means attached to and movable by said float and having lost motion connection with said trip member to impart tripping movements thereto to release the rocker member to permit it to close the valve when a predetermined low liquid level condition is present in the chamber.

4. The combination with a liquid feed controlling device which includes a part forming a chamber having an inlet, a normally open valve for closing said inlet, a pivoted float responsive to predetermied high liquid level conditions in the chamber to close said valve, and trip means responsive to an abnormally high liquid level condition to trip and close said valve and maintain it closed until said means is reset in valve open position, of a lost motion connection between said float and trip means operable by a predetermined low liquid level movement of the float to trip said means.

5. A combination as called for in claim 4, wherein said trip means includes a float actuated trip lever and a trip member rockable in a releasing direction by the lever and in the same direction relative to the lever by said float connection.

6. A combination as called for in claim 4, wherein said trip means includes a float actuated trip lever and a trip member having a fulcrum coincident with that of the lever and rockable in a releasing direction by the lever and in the same direction relative to the lever by said float connection, and wherein said connection has free movement relative to said trip member except when the float is in predetermined low liquid level position.

7. The combination with a liquid level controlling device including a normally open inlet valve in a float chamber, a float in the chamber having an arm pivoted intermediate its ends and adapted to act on the valve to effect a closing thereof when the float rises to a predetermined high liquid level position, of an automatic trip means including a rocker member operable to normally engage and move the valve to closed position, and a trip lever adapted to have releasable catch connection with the rocker member to retain it in open valve position, said lever having an arm projecting over the arm of said float lengthwise thereof and adapted to have loose connection engagement therewith at each side of its pivot whereby the lever will be moved to release said rocker member by one or the other of said connections when the float is either raised to a predetermined high liquid level position or lowered to a predetermined low liquid level position.

KEMPER M. HAMMELL.